(12) United States Patent
Kratzer et al.

(10) Patent No.: US 8,821,093 B2
(45) Date of Patent: Sep. 2, 2014

(54) WHEEL NUT ASSEMBLY

(75) Inventors: Oliver Clemens Robert Kratzer, Surry Hills (AU); Jon Berengut, Surry Hills (AU); Michael Ferman, Peakhurst (AU)

(73) Assignee: Michael Ferman, New South Wales (AU)

( * ) Notice: Subject to any disclaimer, the term of this patent is extended or adjusted under 35 U.S.C. 154(b) by 194 days.

(21) Appl. No.: 13/508,784

(22) PCT Filed: Nov. 12, 2010

(86) PCT No.: PCT/AU2010/001507
§ 371 (c)(1),
(2), (4) Date: Apr. 22, 2013

(87) PCT Pub. No.: WO2011/057337
PCT Pub. Date: May 19, 2011

(65) Prior Publication Data
US 2013/0209194 A1    Aug. 15, 2013

(30) Foreign Application Priority Data

Nov. 13, 2009    (AU) ................................ 2009905537

(51) Int. Cl.
*F16B 39/10*    (2006.01)
*F16B 39/32*    (2006.01)
*F16B 37/14*    (2006.01)
*F16B 39/08*    (2006.01)
*F16B 41/00*    (2006.01)
*B60B 23/06*    (2006.01)

(52) U.S. Cl.
CPC ................. *B60B 23/06* (2013.01); *F16B 39/32* (2013.01); *F16B 37/14* (2013.01); *F16B 39/08* (2013.01); *F16B 41/00* (2013.01); *F16B 39/10* (2013.01)
USPC ........................... 411/204; 411/205; 411/218

(58) Field of Classification Search
USPC ......... 411/119, 120, 191, 192, 195–197, 204, 411/205, 206, 208, 214, 218–219, 372.6, 411/373, 374, 429
See application file for complete search history.

(56) References Cited

U.S. PATENT DOCUMENTS

| 479,131 | A | * | 7/1892 | Arthur | 411/195 |
|---|---|---|---|---|---|
| 1,184,646 | A | * | 5/1916 | Holden | 411/204 |
| 1,651,187 | A | * | 11/1927 | Cole | 411/204 |
| 5,205,616 | A | * | 4/1993 | Wright | 301/37.374 |

(Continued)

*Primary Examiner* — Roberta Delisle
(74) *Attorney, Agent, or Firm* — Novak Druce Connolly Bove + Quigg LLP

(57) ABSTRACT

A wheel nut assembly for fixing a wheel to a vehicle hub which includes a wheel nut with an internal thread; a wheel stud having an external thread to co-operate with the internal thread of said wheel nut and having an end portion adapted to project beyond the wheel nut which end portion includes axial grooves o ribs on its external surface; a retaining cap with internal grooves or ribs complementary to the external ribs or grooves on said wheel stud adapted to fit over said wheel stud and said wheel nut; and means to secure the retaining cap to said wheel nut. The retaining cap prevents rotation of the nut once it has been tightened In some embodiments an aesthetic cover is provided to improve the appearance of the wheel. This aesthetic cover may also be used to lock the retaining cap to the nu and provide an indication that the nut is securely fastened.

8 Claims, 24 Drawing Sheets

(56) References Cited

U.S. PATENT DOCUMENTS

| | | | | |
|---|---|---|---|---|
| 5,395,196 | A * | 3/1995 | Notaro | 411/396 |
| 5,752,794 | A * | 5/1998 | Krawczak | 411/374 |
| 6,053,681 | A | 4/2000 | Mattershead | |
| 6,695,557 | B2 * | 2/2004 | Hove et al. | 411/429 |
| 6,916,144 | B2 | 7/2005 | Lees | |
| 6,935,825 | B2 | 8/2005 | Winker | |
| 7,172,380 | B2 * | 2/2007 | Lees et al. | 411/372.5 |
| 2004/0047708 | A1 * | 3/2004 | Wang et al. | 411/204 |

* cited by examiner

WHEEL NUT ASSEMBLY

PRIORITY

Priority is claimed as a national stage application, under 35 U.S.C. §371, to PCT/AU2010/001507, filed Nov. 12, 2010, which claims priority to Australian Application No. 2009905537, filed Nov. 13, 2009. The disclosures of the aforementioned priority applications are incorporated herein by reference in their entirety.

This invention relates to wheel nuts for retaining vehicle wheels on the wheel hub and for ameliorating the risk of the nuts becoming loose.

BACKGROUND TO THE INVENTION

In order to prevent wheel nuts loosening one approach has been to provide a stud for the nut that has an internal thread of opposite hand to the thread of the nut. Such an arrangement is disclosed in U.S. Pat. No. 6,916,144.

Another proposal is to use a compression collar for, the nut as in U.S. Pat. No. 6,935,825.

In these arrangements it is important to have tamper proof nut assembly that visibly indicates that the nut is tightened. In addition it is usual to provide an aesthetic cap or cover for the nut.

It is an object of this invention to provide a tamper evident wheel nut arrangement that also enables the provision of a variety of aesthetic appearances.

BRIEF DESCRIPTION OF THE INVENTION

To this end the present invention provides a wheel nut assembly for fixing a wheel to a vehicle hub which includes a wheel nut assembly for fixing a wheel to a vehicle hub which includes a wheel nut with an internal thread;

a wheel stud having an external thread to co-operate with the internal thread of said wheel nut and having an end portion adapted to project beyond the wheel nut which end portion includes axial grooves or ribs on its external surface;

a retaining cap for the wheel nut, said cap having internal grooves or ribs complementary to the external ribs or grooves on said wheel stud adapted to fit over said wheel stud and secure said wheel nut;

and means to secure the retaining cap to said wheel nut.

In this arrangement the retaining cap prevents rotation of the nut once it has been tightened. In some embodiments an aesthetic cover is provided to improve the appearance of the wheel. This aesthetic cover may also be used to lock the retaining cap to the nut and provide an indication that the nut is securely fastened.

Any suitable means may be provided to secure the retaining cap to the nut. Preferably the cap consists of two components which are lockable together, one component engaging the nut and the second component engaging the end of the stud.

In a preferred embodiment a ratchet mechanism is used to secure the nut. In this embodiment there is provided a wheel nut assembly for fixing a wheel to a vehicle hub which includes a wheel nut with an internal thread and an axially extending cylindrical wall extending above the nut;

a wheel stud having an external thread to co-operate with the internal thread of said wheel nut and having an end portion adapted to project beyond the wheel nut into the space defined by the axially extending cylindrical wall the end portion of said stud includes axial ribs on its external surface;

a nut retaining mechanism which includes a ratchet arm resiliently urged against said ribs on said stud and an unlocking mechanism associated with said ratchet arm to disengage said ratchet arm from the ribs of said stud.

Preferably the unlocking mechanism requires pressure to be applied against the force of a spring and rotation to a position that disengages the ratchet arm from the ribs of the stud to enable the nut to be turned for removal.

DETAILED DESCRIPTION OF THE INVENTION

Various embodiments of the invention will be described with reference to the drawings in which FIG. 1 illustrates a cross sectional view of the latched position of a first embodiment;

Figure 1:
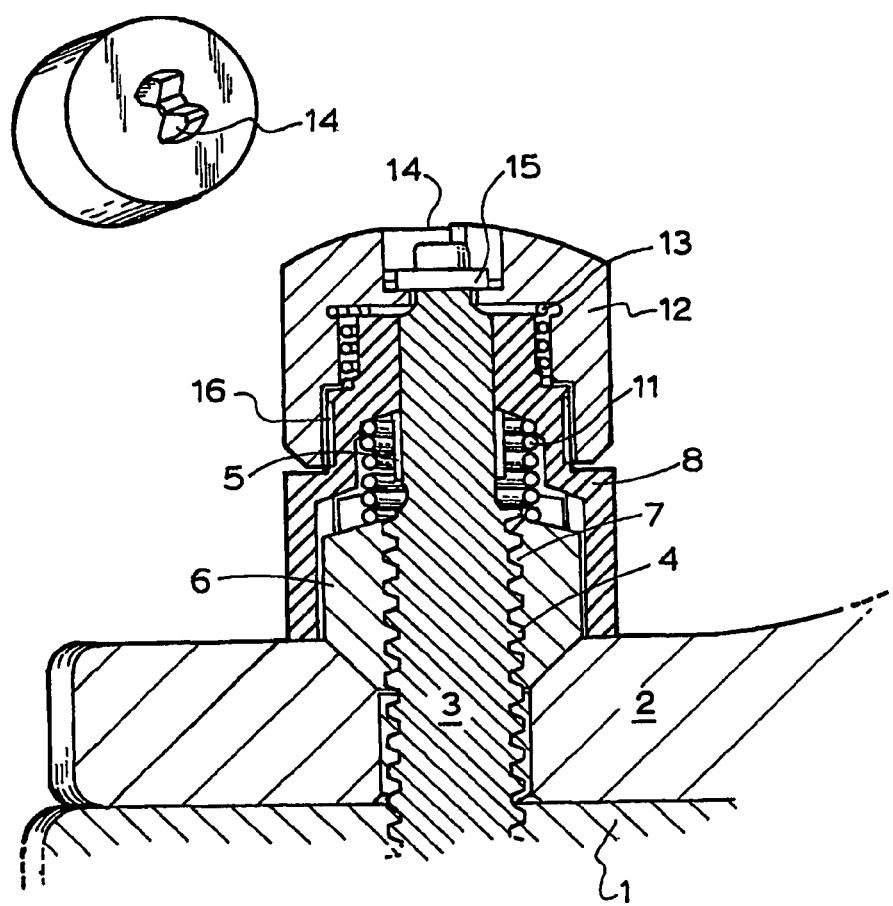

In all embodiments the wheel hub 1 is secured to the alloy wheel rim 2 by the stud 3 and its associated wheel nut 6. The stud 3 has helical threads 4 that cooperate with corresponding threads 7 on the Internal surface of nut 6. The stud 3 extends beyond the nut 6 and on this portion gas splines 5. The retainer cap 8 fits over the nut 6 and snugly to the upper portion of the stud 3. The upper portion of the retaining cap 8 Includes grooves 9 corresponding to the splines 5 of stud 3.

Figure 2:
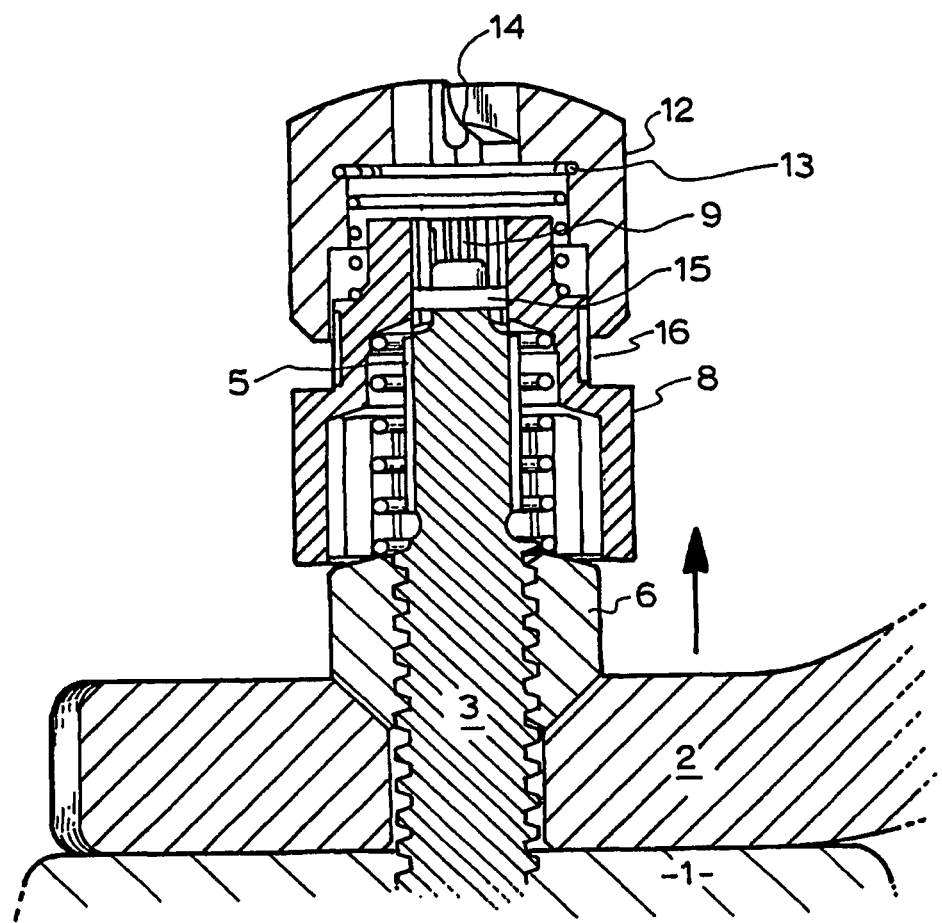
FIG. 2 illustrates a cross sectional view of the unlatched position of the embodiment of FIG. 1.

In the embodiment of FIGS. 1 and 2 the retaining cap 8 is biased against the nut 6 by a spring 11 and is pressed downwards by the action of the cover 12 which itself is biased against cap 8 by a spring 13, the cover 12 includes an opening 14 shaped to cooperate with a cross member 15 in the stud 3. Rotation of the cover 12 when it is pressed down locks it onto the cross member 15. A colour panel 16 on the retaining cap 8 indicates that the cap is not locked if it is visible.

Figures 3, 4:
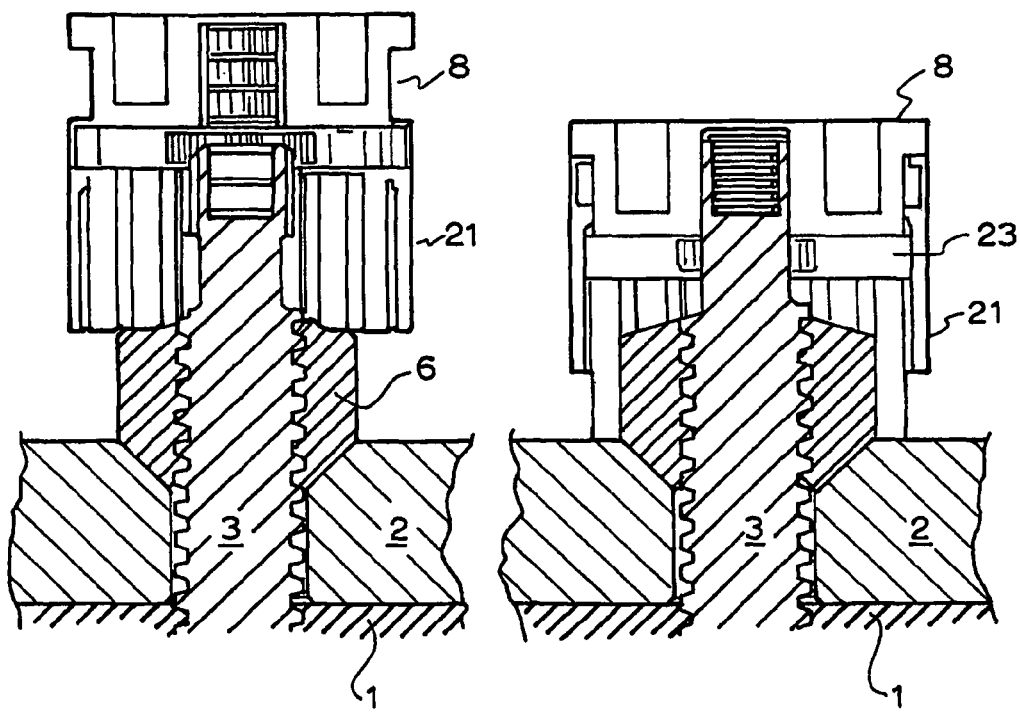
FIG. 3 illustrates a cross sectional view of the latched position of a second embodiment.
FIG. 4 illustrates a cross sectional view of the unlatched position of the embodiment of FIG. 3.
Figure 5:
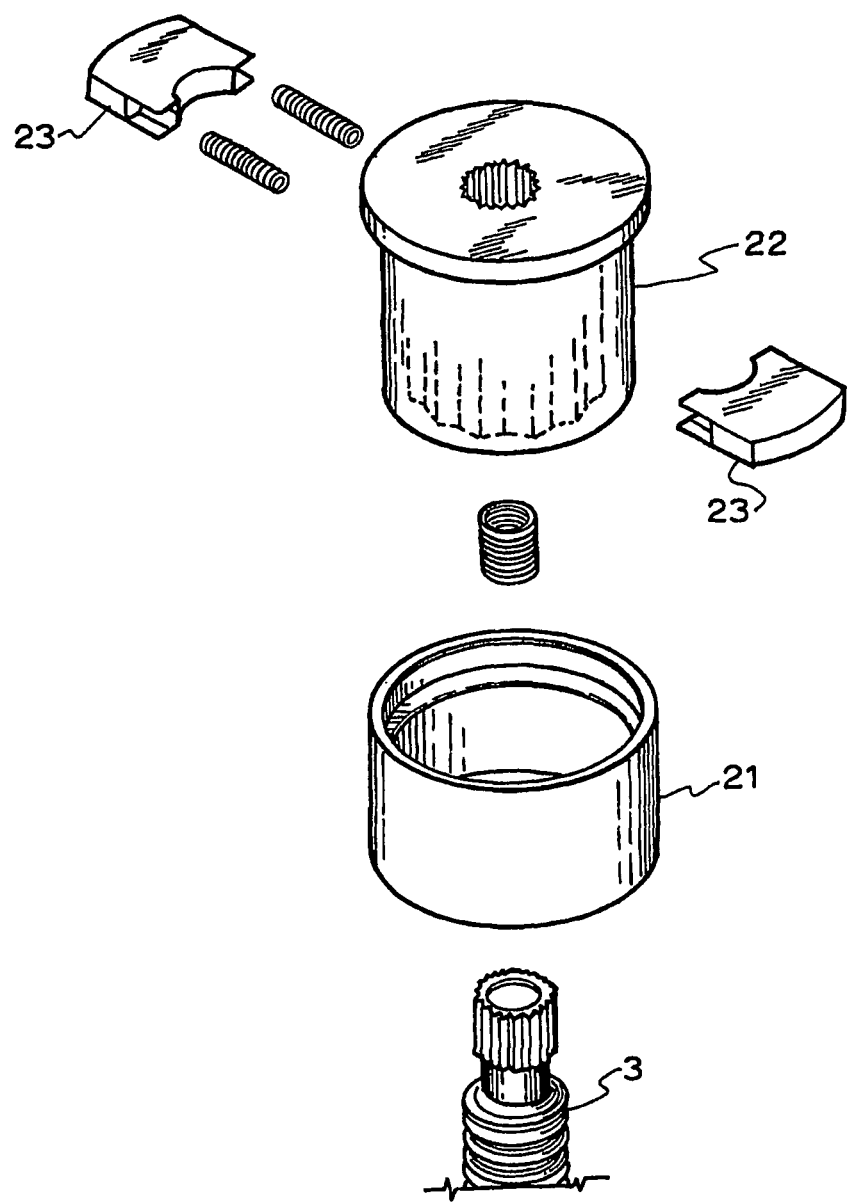
FIG. 5 is an exploded view of the embodiment of FIGS. 2 and 3.

In the second embodiment of FIGS. 3 to 5 the retaining cap 8 is surrounded by a cylindrical cover 21 and includes recesses 22 to accommodate spring biased blocks 23 which engage stud 3 below the splines 5 when they are locked in position by the cover 21. This arrangement is suitable where there is a fixed extension of the stud.

Figures 6, 7:
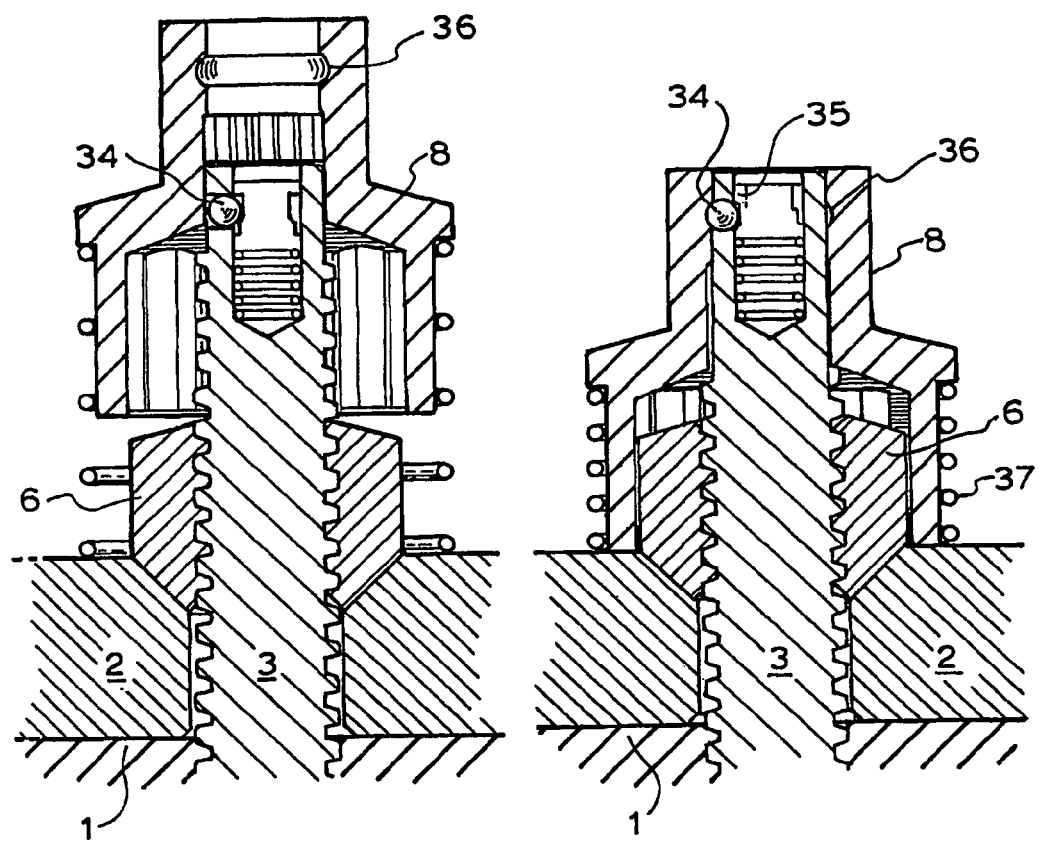
FIG. 6 illustrates a cross sectional view of the latched position of a third embodiment.
FIG. 7 illustrates a cross sectional view of the unlatched position of the embodiment of FIG. 63.
Figure 8:
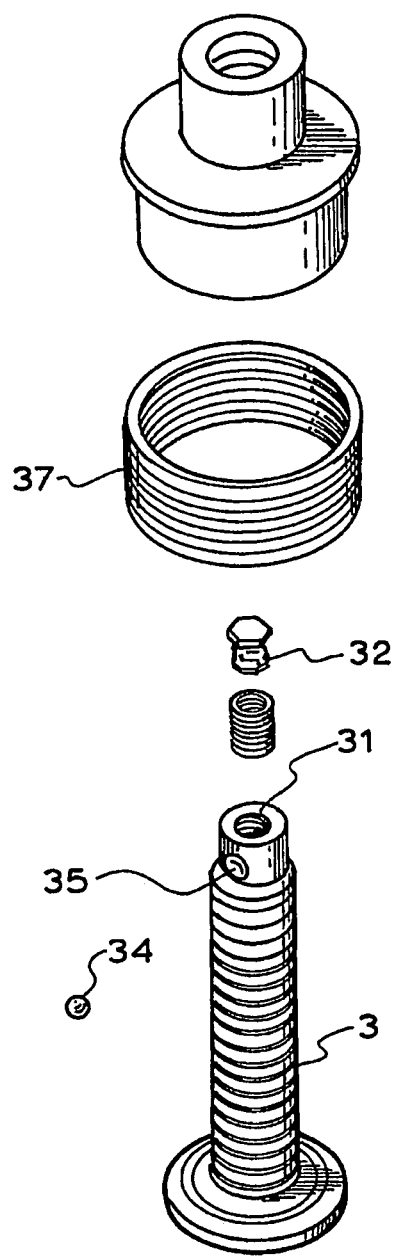
FIG. 8 is an exploded view of the embodiment of FIGS. 6 and 7.

In the third embodiment of FIGS. 6 to 8 the stud 3 has a hollow stem 31 at its remote end which includes a spring biased core 32 with a groove 33 for engaging a ball 34 that seats within a hole 35 in the upper wall of the stud. The upper portion of the retaining cap 8 includes a groove 36 that also engages the ball 34. An external spring 37 biasses the cap 8 away from the nut 6. This is a compact design.

Figures 9, 10:
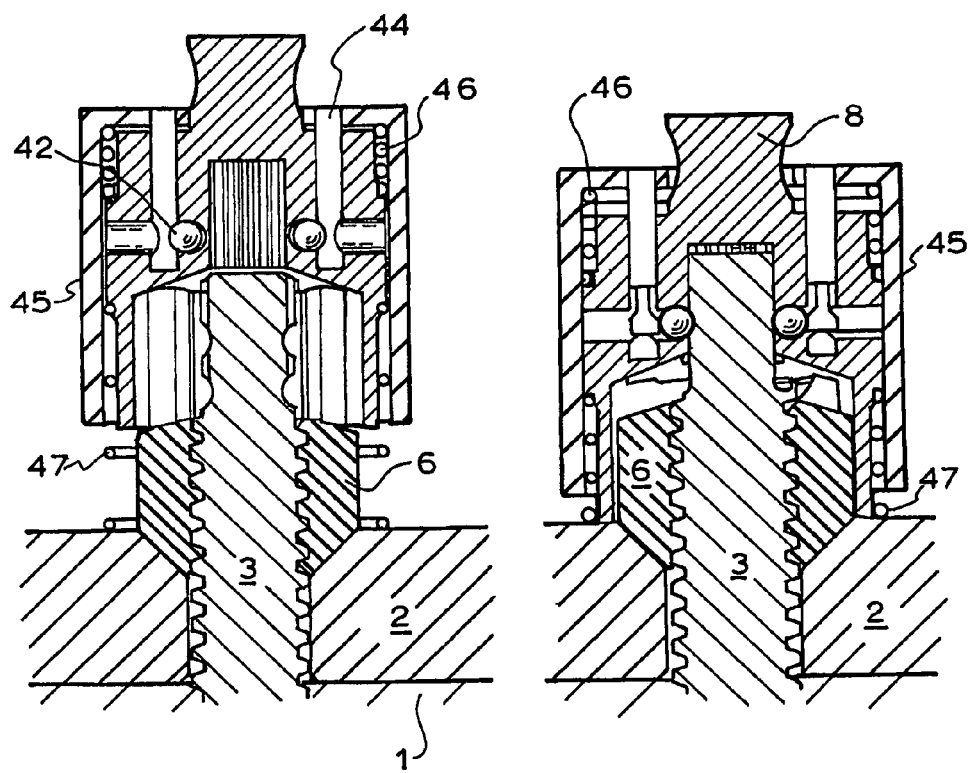
FIG. 9 illustrates a cross sectional view of the latched position of a fourth embodiment.
FIG. 10 illustrates a cross sectional view of the unlatched position of the embodiment of FIG. 9.
Figure 11:
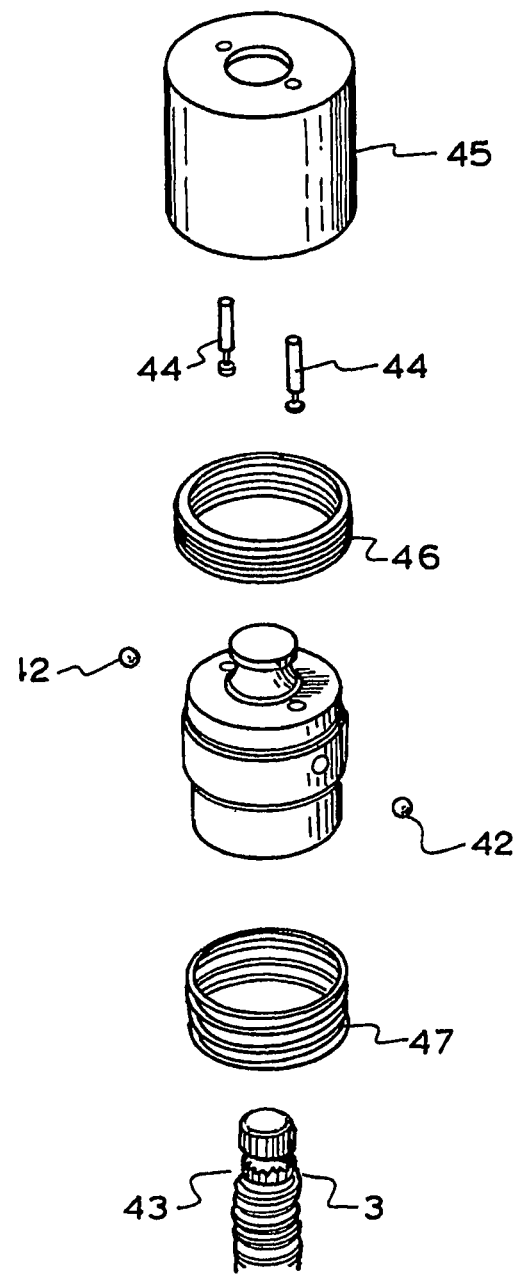
FIG. 11 is an exploded view of the embodiment of FIGS. 9 and 10.

FIGS. 9 to 11 illustrate a fourth embodiment utilising a push pull arrangement. The retaining cap radial grooves 41 for balls 42 that engage a grooved recess 43 in the upper part of stud 3. Two pins 44 arranged concentrically with stud 3 bias the balls 42. A cover 45 encloses the retaining cap 8. Rotation of the cover 45 locks the cover and retaining ca against the bias of spring 46 located at the upper end of cap 8 and against the top of cover 45. The spring 47 acts between the wheel rim 2 and the cap 8.

Figure 12:
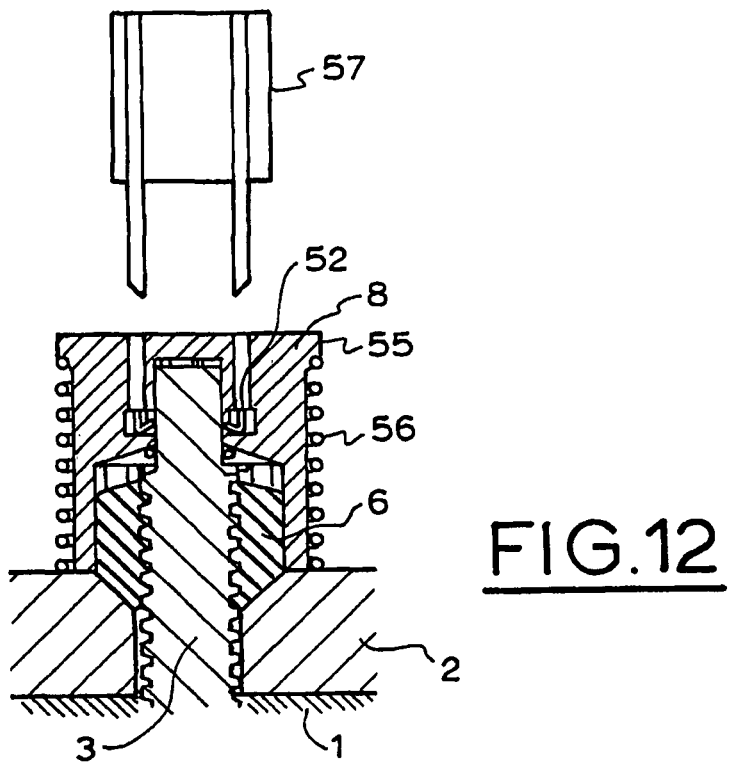
FIG. 12 illustrates a cross sectional view of the latched position of a fifth embodiment.
Figure 13:
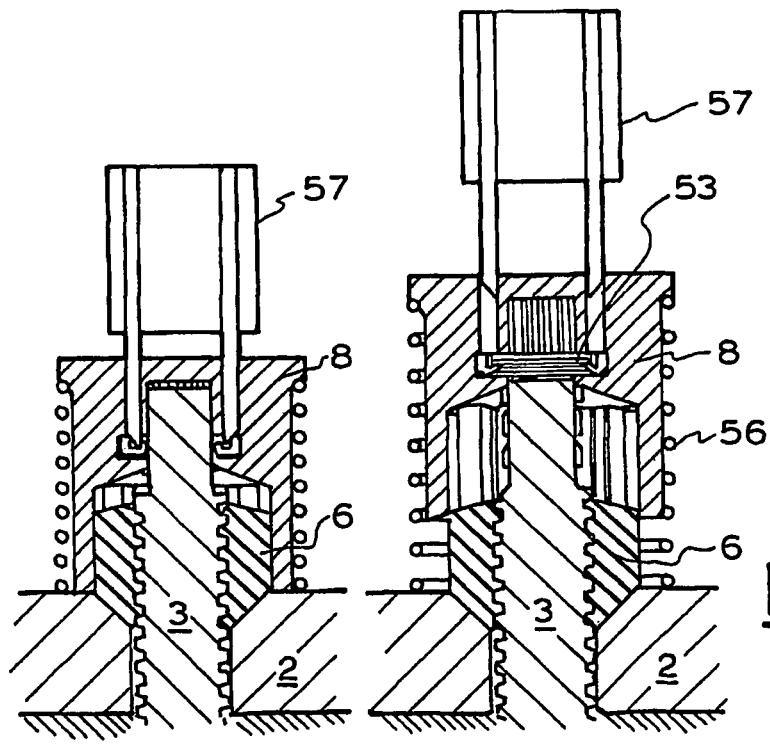
FIG. 13 illustrates a cross sectional view of the tool unlatching and the unlatched position of the embodiment of FIG. 12.
Figure 14:
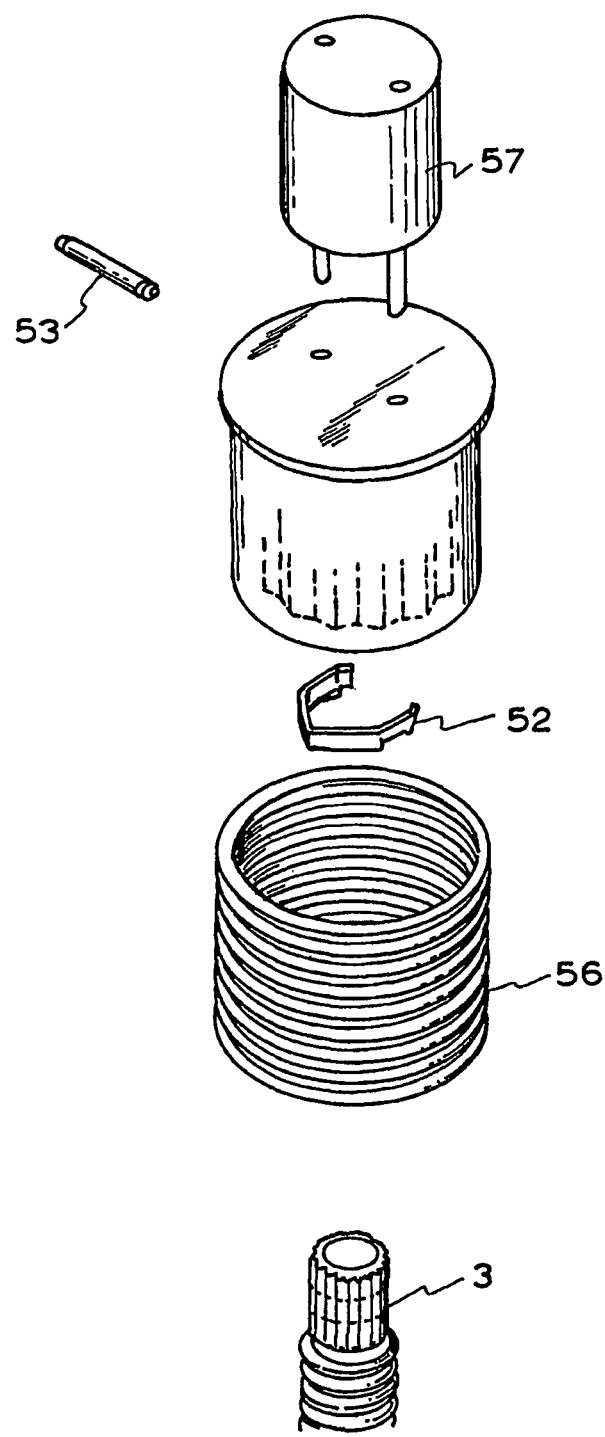
FIG. 14 is an exploded view of the embodiment of FIGS. 12 and 13.

Another mechanism is illustrated in a fifth embodiment which uses a tool to unlock the retaining cap as shown in FIGS. 12-14. A C clip 52 is inserted from below in to the retaining cap 8 and is stopped from rotating by a spring pin 53. The C clip 52 engages grooves in the splined portion of the stud 3. A spring 56 is placed externally of the cap 8 between flange 55 and the rim 2. The tool 57 releases C clip to unlock the assembly.

Figures 15, 16:
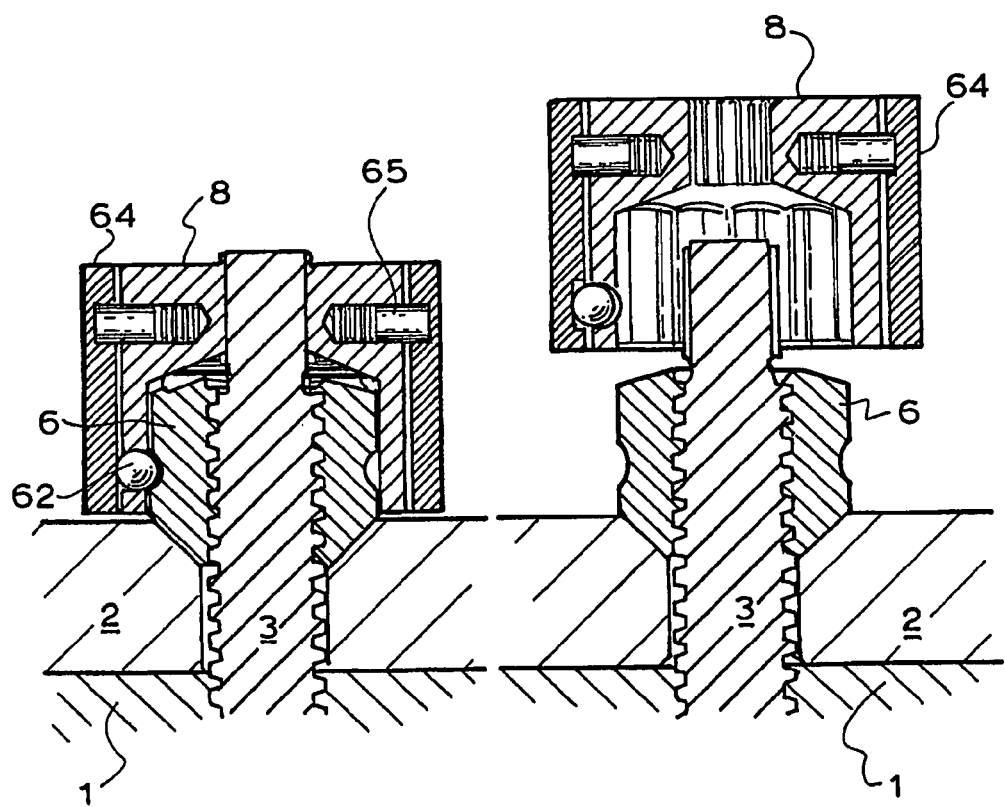
FIG. 15 illustrates a cross sectional view of the latched position of a sixth embodiment.
FIG. 16 illustrates a cross sectional view of the unlatched position of the embodiment of FIG. 15.
Figure 17:
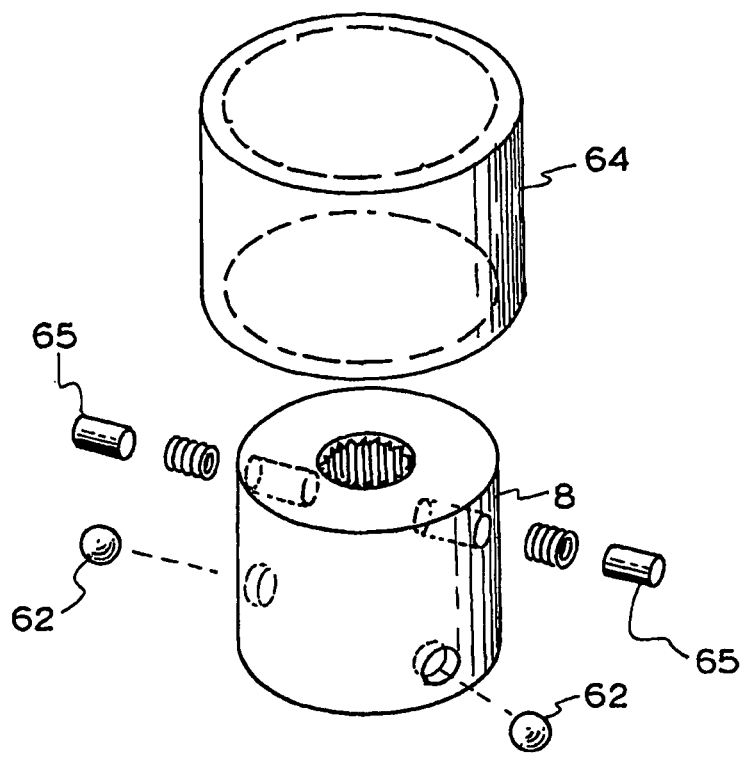
FIG. 17 is an exploded view of the embodiment of FIGS. 15 and 16.
Figure 17:
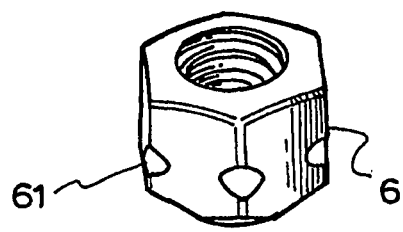
Figure 17:
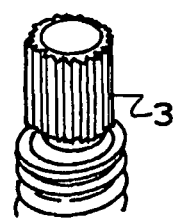

The sixth embodiment illustrated in FIGS. 15-17 uses a custom nut with recesses 61 in its corners to engage balls 62 carried in holes 63 of the retaining cap 8. A cover 64 has associated spring plugs 65 that are inserted in radial holes in the retaining cap.

Figures 18, 19:
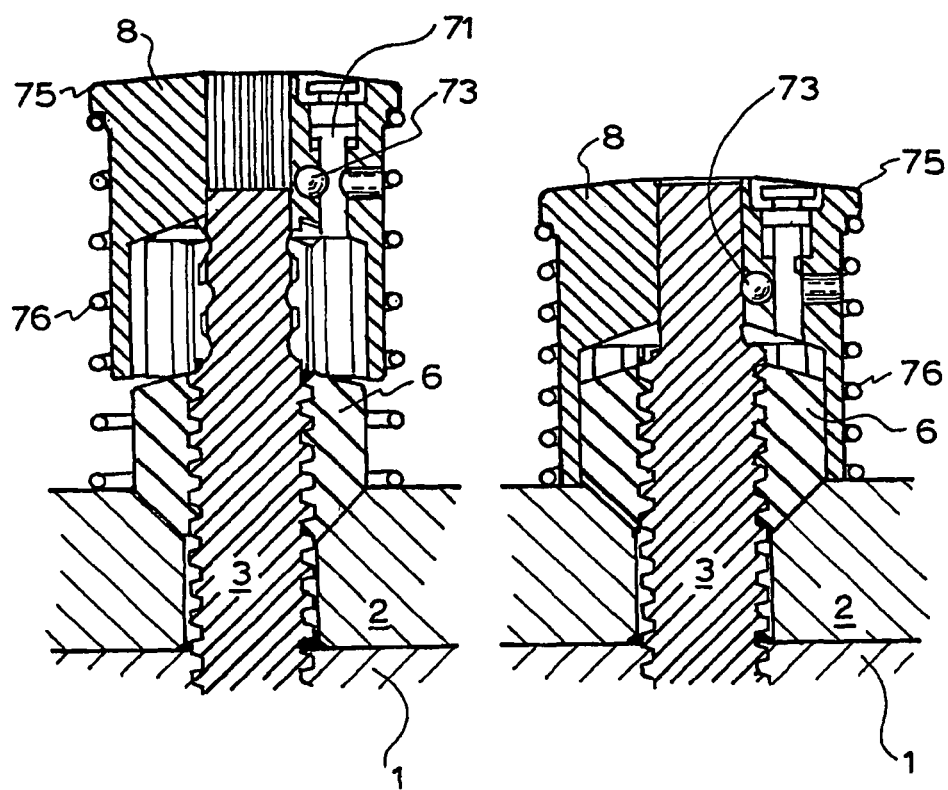
FIG. 18 illustrates a cross sectional view of the latched position of a seventh embodiment.
FIG. 19 illustrates a cross sectional view of the unlatched position of the embodiment of FIG. 18.
Figure 20:
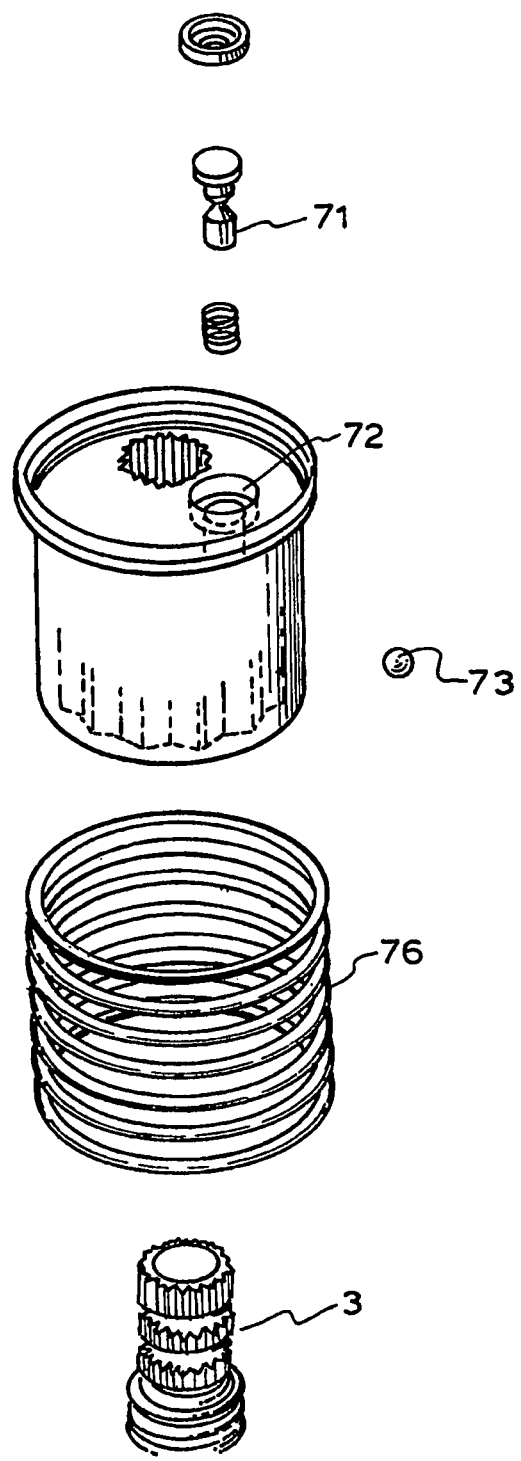
FIG. 20 is an exploded view of the embodiment of FIGS. 18 and 19.

The seventh embodiment shown in FIGS. 18-20 uses a spring loaded pin 71 arranged in a passage 72 in the retaining cap 8 that pushes a ball 73 into engagement with a groove 74 in the splined end of the stud 3. A spring 76 is placed externally of the cap 8 between flange 75 and the rim 2.

Figures 21, 22:
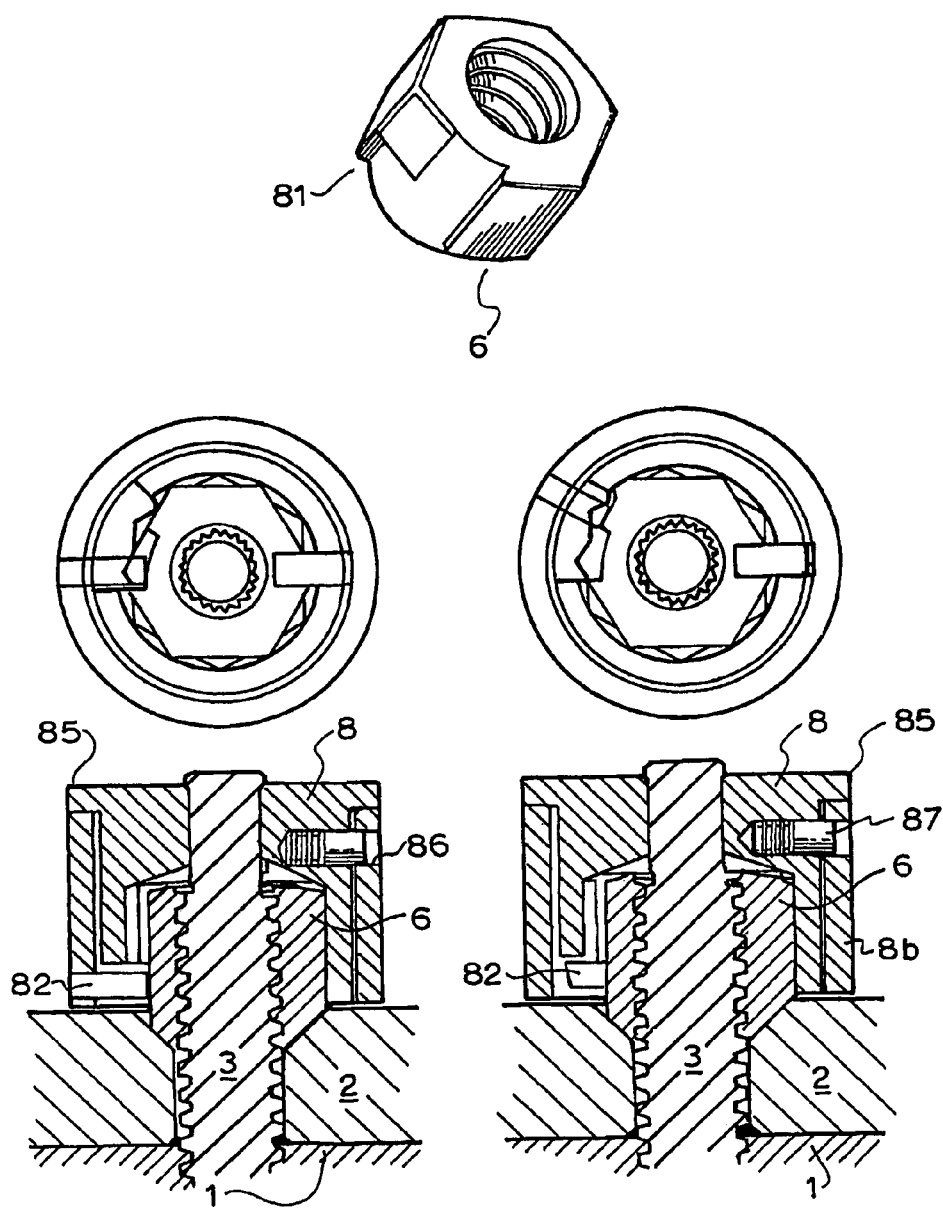
FIG. 21 illustrates a cross sectional view of the latched position of an eighth embodiment.
FIG. 22 illustrates a cross sectional view of the unlatched position of the embodiment of FIG. 21.
Figure 23:
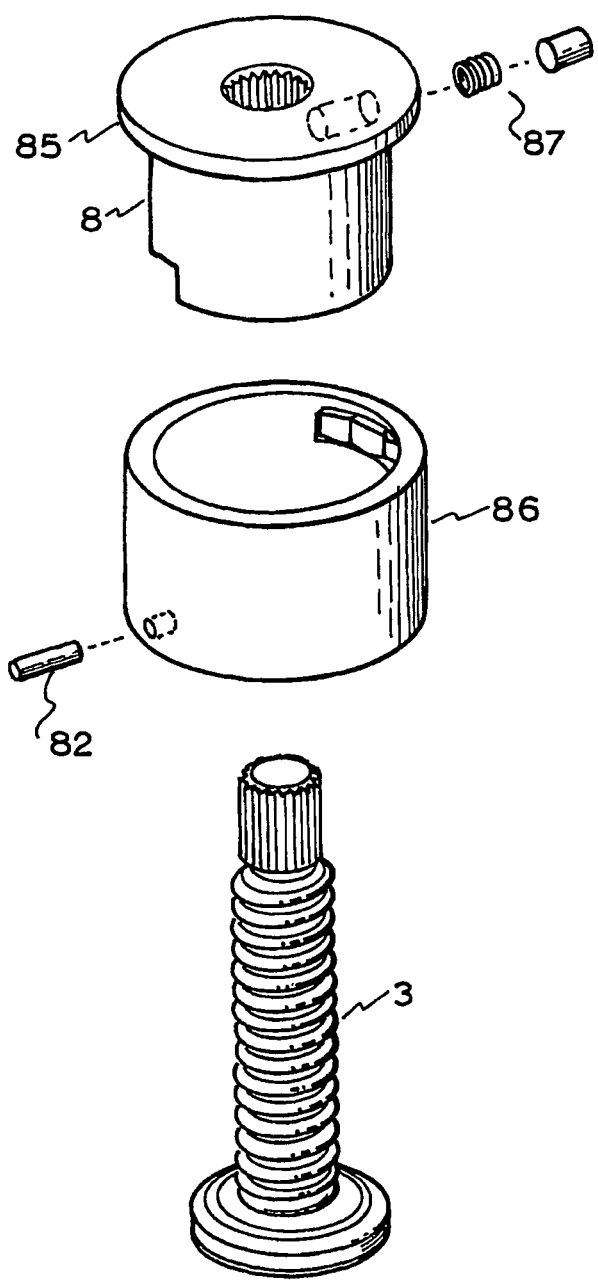
FIG. 23 is an exploded view of the embodiment of FIGS. 21 and 22.

FIGS. 21-23 illustrate an eighth embodiment that utilises a custom nut design with a cut out portion 81 to accept a plug 82 for locking. The cap 8 also has a cut out 83 corresponding with that in the nut 6. A cylindrical cover 86 seats under flange 85 of cap 8. A spring retaining pin 87 may be used to secure the cover 86 to cap 8.

Figure 24:
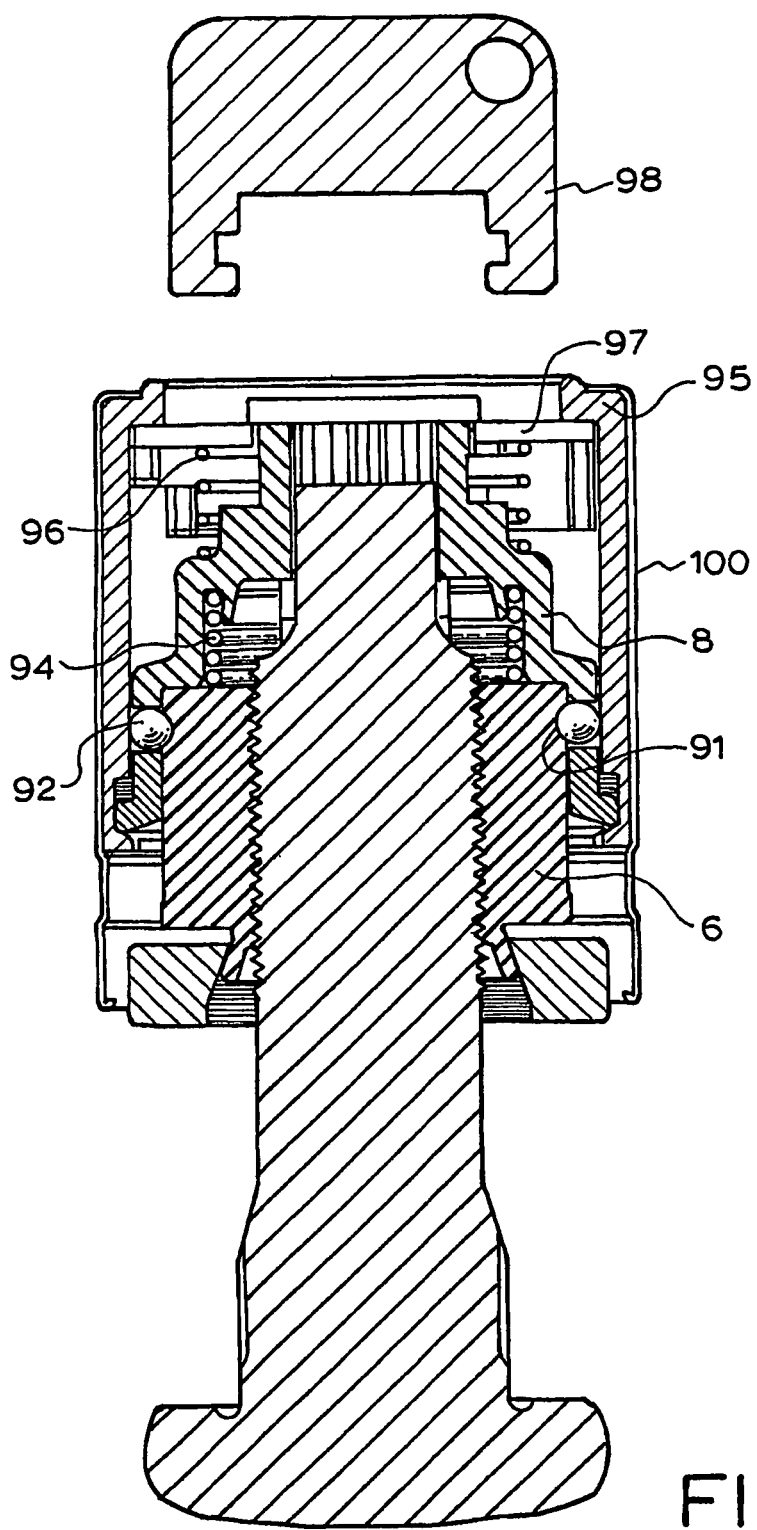
FIG. 24 illustrates a crosssectional view of a ninth embodiment.
Figure 25:
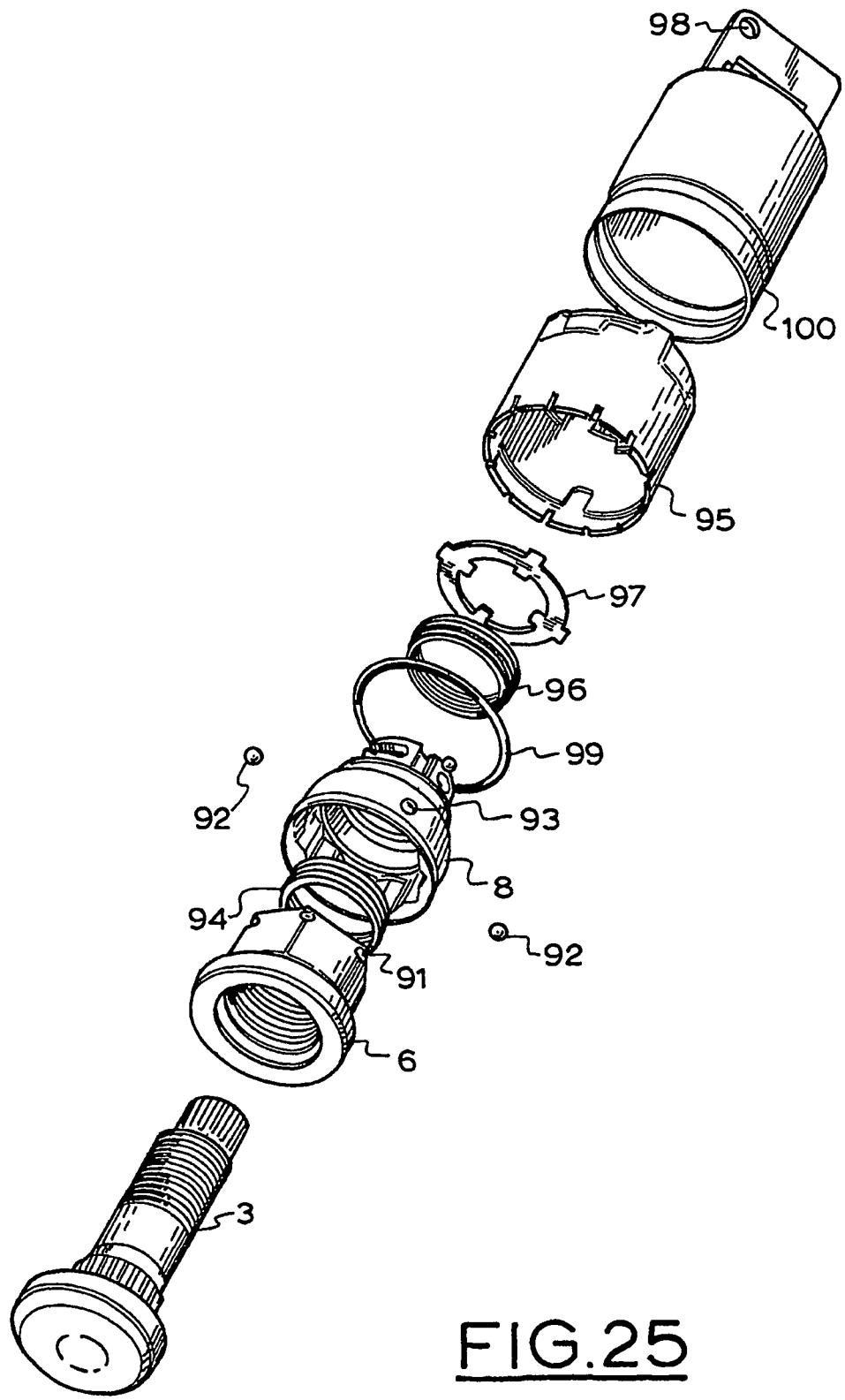
FIG. 25 is an exploded view of the components of the FIG. 24 embodiment
Figure 26:
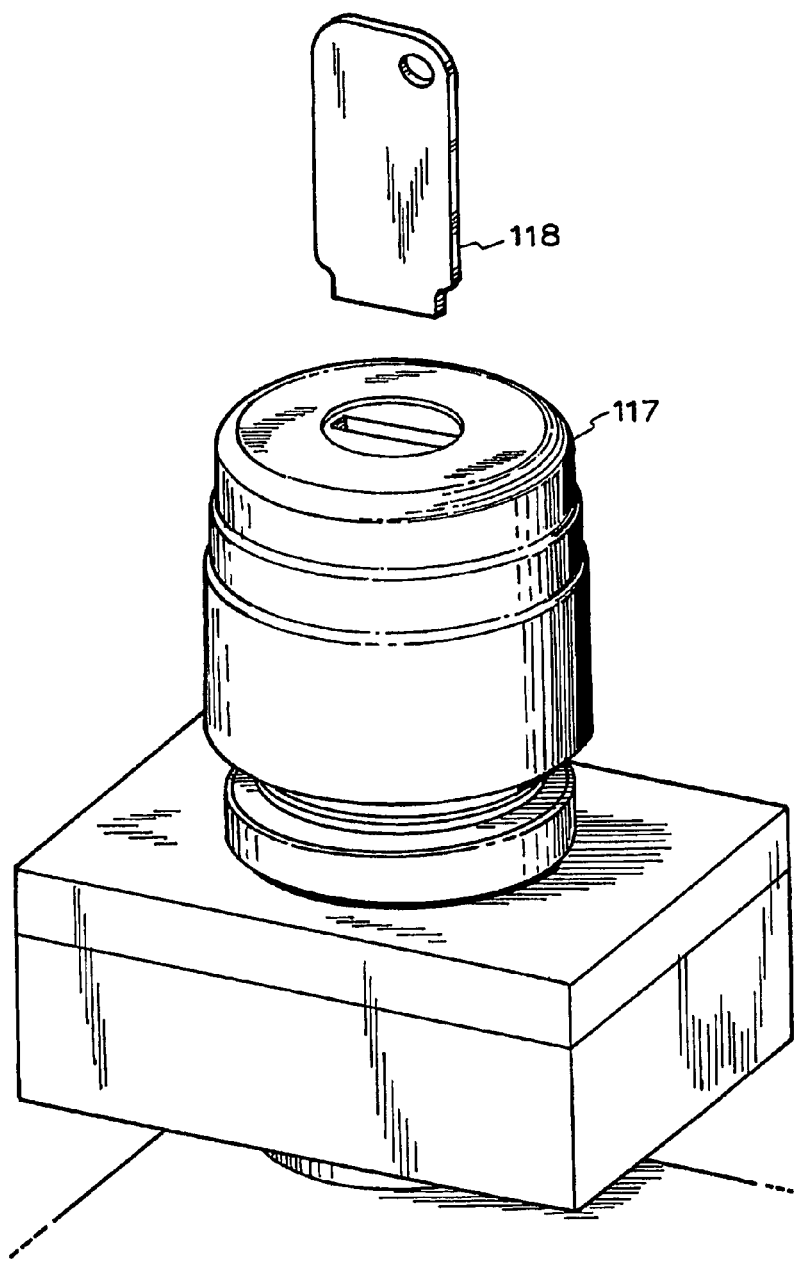
FIG. 26 is a view of a tenth embodiment.
Figure 27:
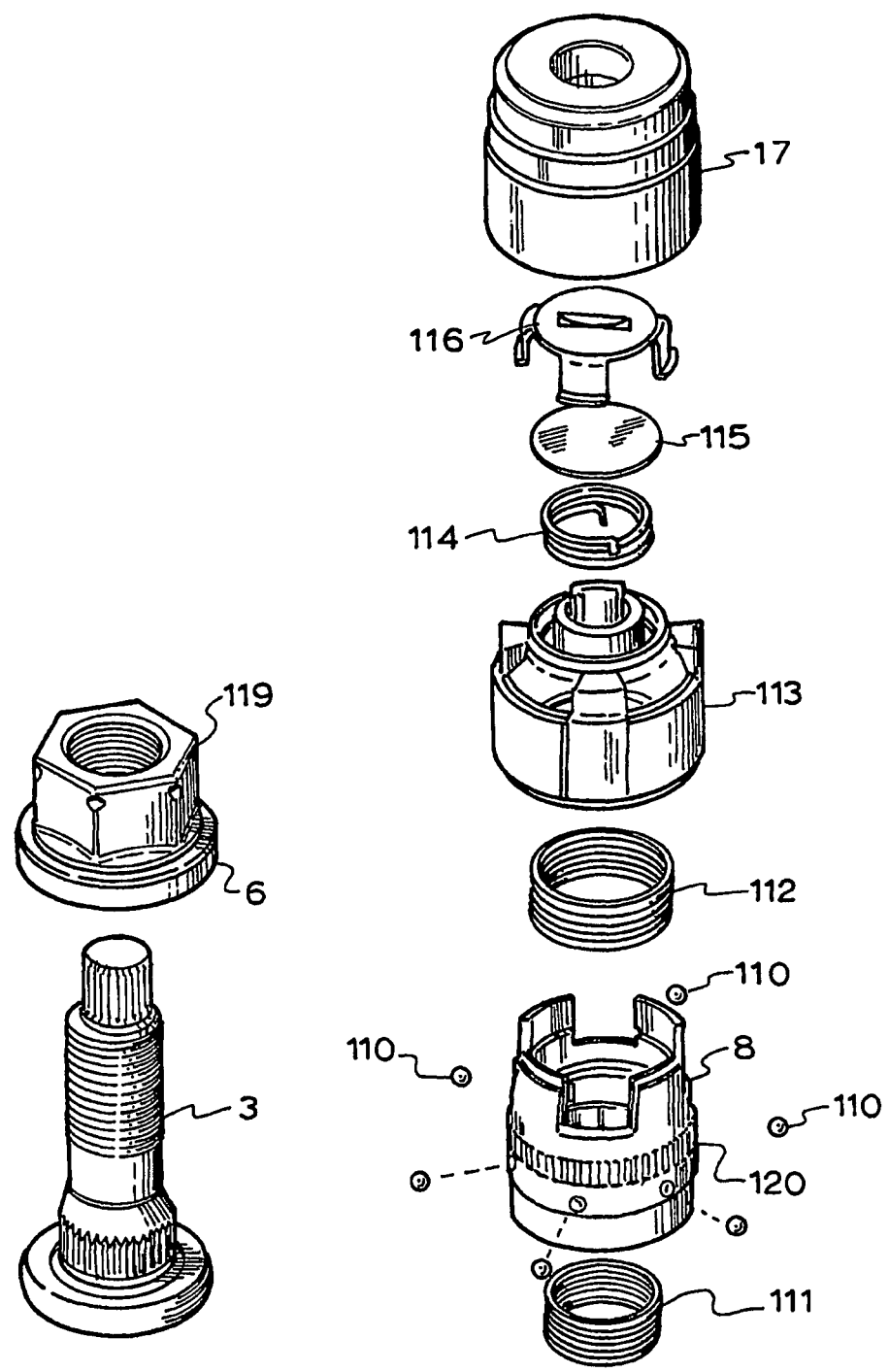
FIG. 27 is an exploded view of the components of the embodiment of FIG. 26.

In the ninth embodiment shown in FIGS. 24 and 25 a custom nut 6 is used which has recesses 91 for the balls 92. The balls 92 sit in holes 93 in the side wall of the retaining cap 8. A spring 94 is located internally of the cap 8 to bias the cap 8 away from nut 6. A cylindrical cover 95 encloses the retaining cap 8. A spring 98 seats on the outside of the upper portion of the cap 8 to bear against the clutch ring 97 that lies underneath the top of cover 95. A key 98 is used to depress and turn the clutch ring 97 so that the cover 95 is locked to the cap 8. An O ring 99 provides a seal between lower edge of the cover 95 and the lower edge of the cap 8. The clutch ring 97 provides a seal at the top to prevent dirt entering under cover 95. The cover 8 may carry a decorative cover 100.

Figures 28, 29, 30:
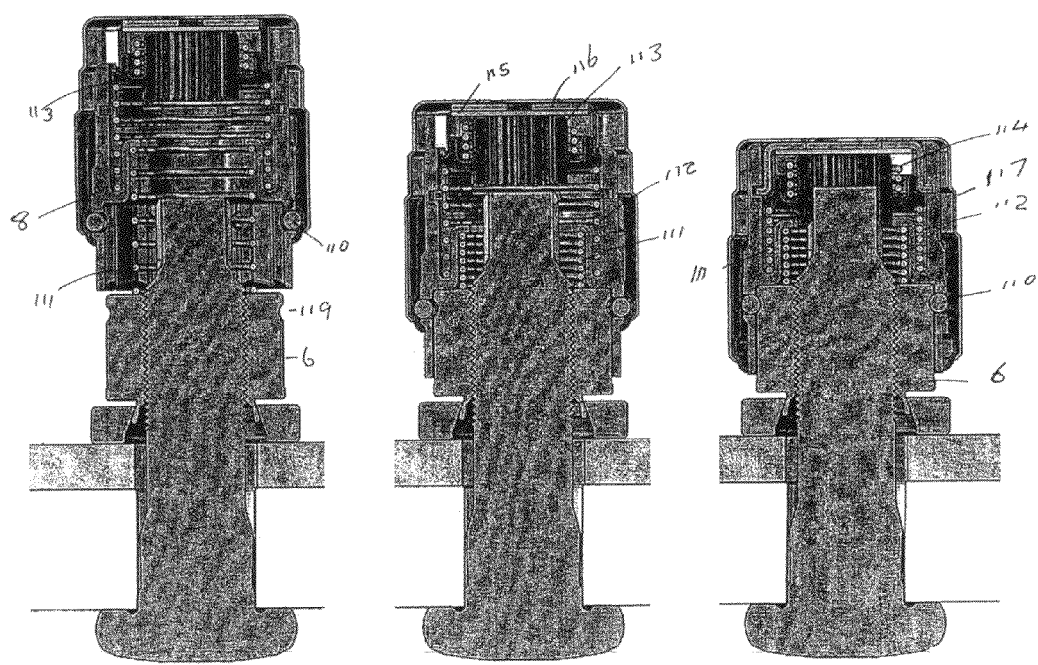
FIGS. 28 to 30 illustrate the operation of the embodiment of FIG. 26.

In the tenth embodiment shown in FIGS. 26-30 the nut 6 and custom stud 3 are the same. The nut includes recesses 119 for locking balls 110. The cap or socket lock 8 seats around the nut and the ejector spring 111 sits within cap 8 on top of the nut 6. The out surface of the cap or socket lock includes splines or ribs 120. The spline lock 113 engages the splines on the end of stud 3 and also engages the spline 120 of cap 8. The nut spring 112 lies between the spline lock 113 and the cap 8. On top of the spline lock is a disc 115 that sits on the lock spring 114 which is held within the spline lock 113. The rotary lock 116 extends over the disc 115 and the spring 114 to abut an outer rim of the spline lock 113. The cover 117 encloses all the components including the locking balls 110 which are held in holes in the wall of cap 8 as best seen in FIGS. 28-30.

The ratio of the faces on the nut 6 and the splines on the stud 3 and the splines 120 on cap 8 ensure that only a slight turning of the assembly is needed as it is pressed down to align the faces and splines.

The assembled wheel lock is fitted as shown in FIGS. 28-30. In FIG. 28 the assembly sits on the tightened nut 6. In FIG. 29 the assembly has been pushed down to compress the ejector spring 111. As the assembly is pushed down it is turned slightly so that the internal hexagon faces of cap 8 engages the faces of wheel nut 6 and the locking balls are held in the recesses 119 of the nut 6. In FIG. 30 the assembly is pushed down further and again turned slightly so that the spline lock 113 engages the splines on the end of stud 3 and splines 120 on cap 8. The socket lock or cap 8 now engages with the spline lock 113 and the balls 110 are locked into the recesses 119 on nut 6. Using the key 118 the rotary lock 116 is turned which locks the entire assembly together and to the stud and nut.

Figure 31:
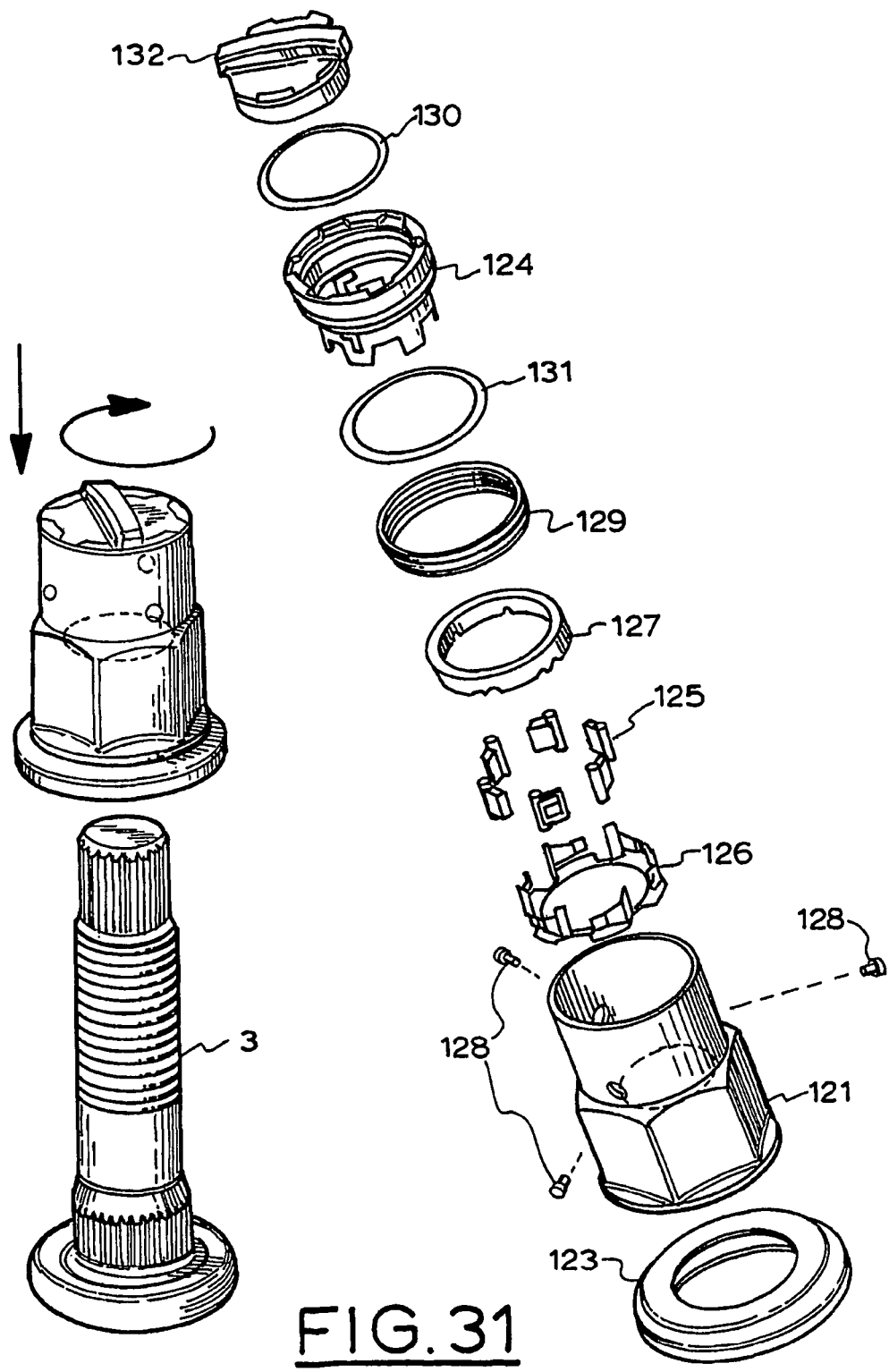
FIG. 31 is an exploded view of the components of an eleventh embodiment.
Figure 32A:
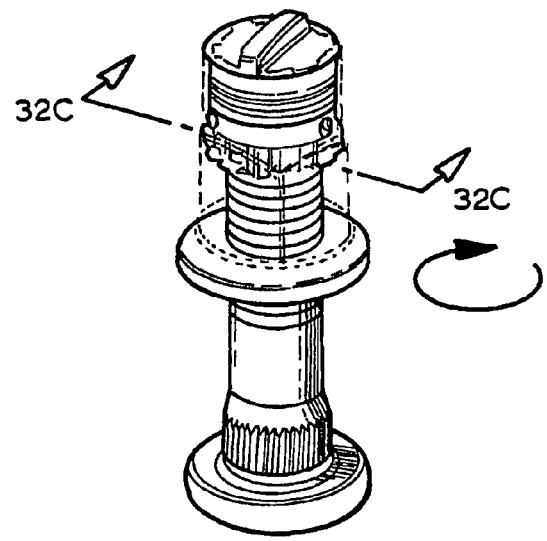
FIGS. 32 and 33 illustrate the operation of the embodiment of FIG. 31.
Figure 32B:
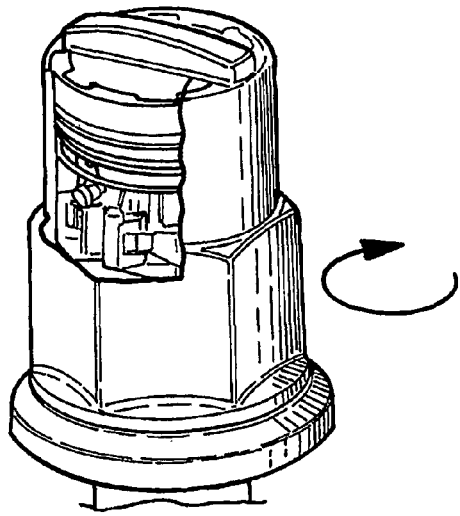
Figure 32C:
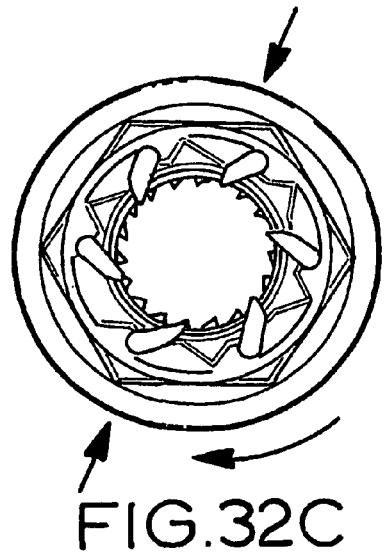
Figure 33A:
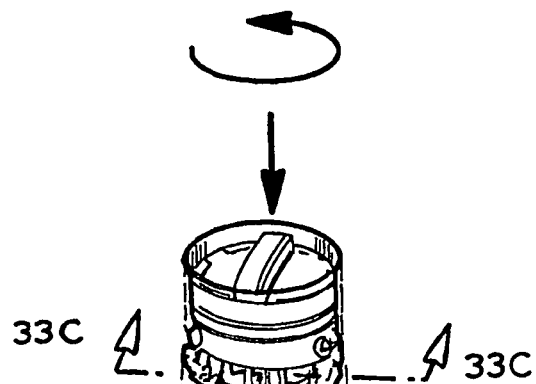
Figure 33B:
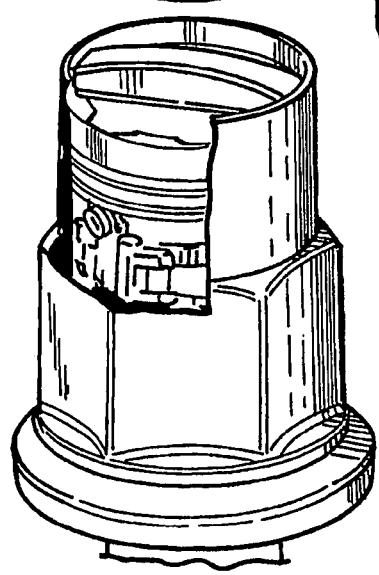
Figure 33C:
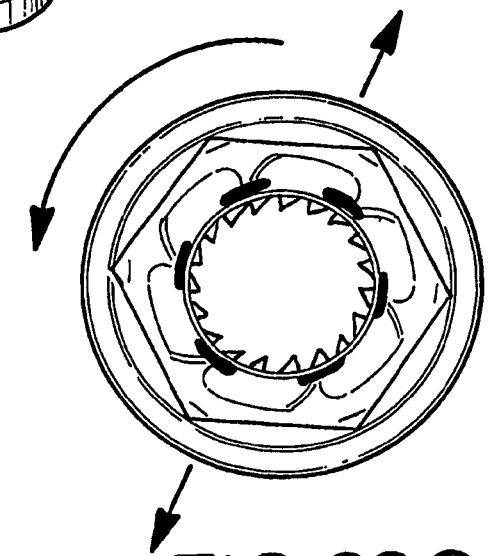

FIGS. 31 to 33 illustrate an eleventh embodiment which uses a ratchet mechanism to secure the retaining cap to the wheel nut and provides a visual indication of the lock status of the wheel nut. The stud 3 is the same as in prior embodiments. The nut 121 includes a circumferential cover extending above the nut to accommodate the ratchet locking mechanism. The custom screws 128 secure the ratchet sleeve 124 to the nut 121.

The ratchet mechanism consists of pawls 125 that engage with the splines on the end of stud 3 when biased by the spring 126. The ring 127 holds the pawls 125 and spring 126 in position. The spring 129 seats on the ring 127 and the O rings 130 and 131 are positioned above and below the ratchet sleeve 124. The knob 132 engages with the internal rim of the ratchet sleeve 124.

In FIG. 32 view A shows that as the nut is tightened the pawls engage the spline and prevent the nut from coming loose. View B provides a detailed view and view C is a section view along z-z of view A.

FIG. 33 illustrates the removal of the nut. In view A the knob 132 is pushed down and rotated a quarter turn in direction A. View B provides a detailed view and view C is a section view along z-z of view A. The top assembly is retained by the 3 screws 128 engaging in the bayonet guides in ratchet sleeve 124. The top assembly is under constant tension by spring 129. The top assembly disengages the pawls 125 from the splines on stud 3 and the nut can be removed by rotation in direction B of view A.

Those skilled in the art will realise that this invention provides a unique and less expensive means of ensuring that a wheel nut is securely fastened to the wheel hub. Those skilled in the art will also realise that this invention may be implemented in embodiments other than those described without departing from the core teachings of the invention.

The invention claimed is:

1. A wheel nut assembly for fixing a wheel to a vehicle hub, the wheel nut assembly comprising:
    a wheel nut with an internal thread;
    a wheel stud having an external thread to co-operate with the internal thread of said wheel nut and having an end portion adapted to project beyond the wheel nut which end portion includes axial grooves or ribs on its external surface;
    a retaining cap secured to the wheel nut, said cap having internal grooves or ribs complementary to the external ribs or grooves on said wheel stud adapted to fit over said wheel stud and adapted to cover said wheel nut after the wheel nut is fastened to said stud and able to be activated to uncover said nut to enable removal of said nut and cap assembly from said stud.

2. A wheel nut assembly as claimed in claim 1, the cap comprising two components which are lockable together, one component engaging the nut and the second component engaging the end of the stud.

3. A wheel nut assembly as claimed in claim 1, further comprising an aesthetic cover to fit over the retaining cap.

4. A wheel nut assembly as claimed in claim 1, wherein or fixing a wheel to a vehicle hub, the wheel nut:
    the wheel nut incorporates an axially extending cylindrical wall extending above the threaded portion of the nut;
    and the end portion of said stud adapted to project into the space defined by the axially extending cylindrical wall; and
    the assembly includes a ratchet arm resiliently urged against said ribs on said stud and an unlocking mechanism associated with said ratchet arm to disengage said ratchet arm from the ribs of said stud.

5. A wheel nut assembly as claimed in claim 4, wherein the unlocking mechanism is configured such that pressure applied against the force of a spring and rotation to a position that disengages the ratchet arm from the ribs of the stud enables the nut to be turned for removal.

6. A nut retaining mechanism for use in the wheel assembly of claim 4, the mechanism comprising a ratchet arm resiliently urged against the ribs on said stud and an unlocking mechanism associated with said ratchet arm to disengage said ratchet arm from the ribs of said stud.

7. A nut retaining mechanism as claimed in claim 6, wherein the unlocking mechanism is configured such that pressure applied against the force of a spring and rotation to a position that disengages the ratchet arm from the ribs of the stud enables the nut to be turned for removal.

8. A wheel nut and retaining cap assembly for use in the assembly of claim 1, comprising:
    a wheel nut secured to the retaining cap for the wheel, said cap having internal grooves or ribs complementary to the external ribs or grooves on said wheel stud adapted to fit over said wheel stud and adapted to cover said wheel nut after the wheel nut is fastened to said stud and able to be activated to uncover said nut to enable removal of said nut and cap assembly from said stud.

* * * * *